United States Patent
Myers

(10) Patent No.: US 6,732,500 B1
(45) Date of Patent: May 11, 2004

(54) MOWER HEIGHT ADJUSTMENT SYSTEM

(76) Inventor: Robert J. Myers, 4150 Lime Kiln Rd., Placerville, CA (US) 95667

( * ) Notice: Subject to any disclaimer, the term of this patent is extended or adjusted under 35 U.S.C. 154(b) by 0 days.

(21) Appl. No.: 10/407,759

(22) Filed: Apr. 4, 2003

(51) Int. Cl.[7] .............................................. A01D 34/82
(52) U.S. Cl. ........................................ 56/17.2; 56/249
(58) Field of Search ............................... 56/249, 249.5, 56/16.9, 14.4, 17.2, 17.5, 17.6, 294, 253, DIG. 12

(56) References Cited

U.S. PATENT DOCUMENTS

| | | |
|---|---|---|
| 3,190,061 A | 6/1965 | Gilbertson |
| 3,555,793 A | 1/1971 | Chapman |
| 3,755,998 A | 9/1973 | Hoffmeyer |
| 3,948,026 A | 4/1976 | Whitechester |
| 4,481,757 A | 11/1984 | Tsuchiya |
| 4,638,622 A | 1/1987 | Smith |
| 5,511,365 A * | 4/1996 | Rice .................................. 56/7 |
| 5,553,380 A | 9/1996 | Rice |
| 5,870,888 A | 2/1999 | Pugh |

OTHER PUBLICATIONS

The Toro Company; Toro Parts Catalog; 1995; Bloomington, MN.

* cited by examiner

Primary Examiner—Robert E. Pezzuto
(74) Attorney, Agent, or Firm—Heisler & Associates

(57) ABSTRACT

A riser attachment for mower height adjustment includes a bracket attachable to a mower and a roller removably attachable to the brackets. Each bracket includes a cavity therein which receives an arm extending from a support structure which rotatably supports each end of the roller such as through an axle passing through a collar in an interface to which the arm is connected. The roller or other bearing surface extends below a mower support plane in which primary ground support structures of the mower are located. The roller or other bearing surface of the riser attachment thus elevates a cutting reel of the mower slightly to provide a second cutting height for the mower. This second cutting height can be adjusted through height adjusters which control a distance that the arms extend into the cavities of the brackets. Levers are rotatable to secure or release the arms within the cavities.

45 Claims, 3 Drawing Sheets

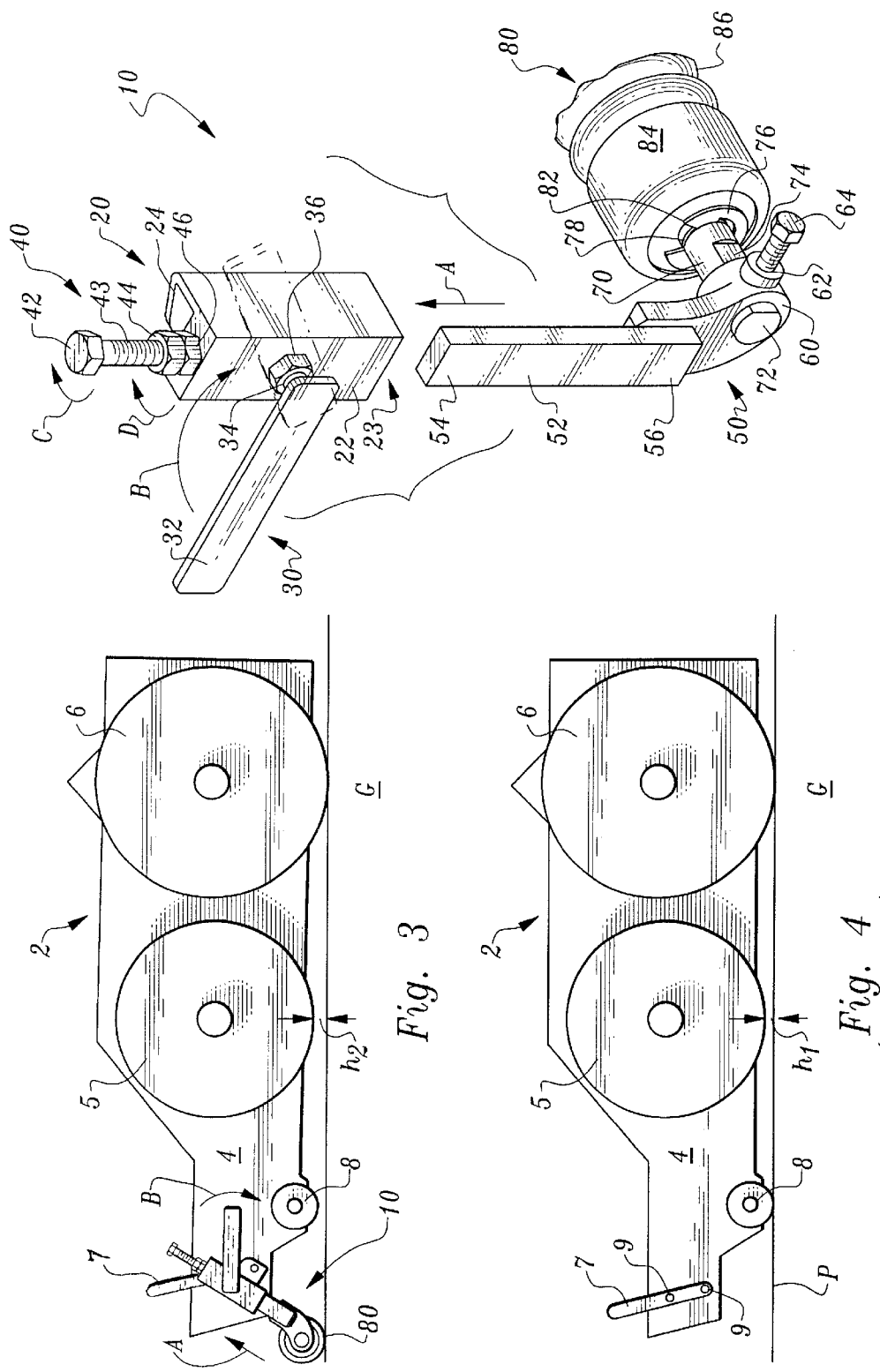

MOWER HEIGHT ADJUSTMENT SYSTEM

FIELD OF THE INVENTION

The following invention relates to grass mowing machines, such as power reel cutting mowers used to cut grass forming a "green" of a golf course. More particularly, this invention relates to a riser attachment or other system for quickly, easily and precisely adjusting a height at which the cutting reel of the mower is set.

BACKGROUND OF THE INVENTION

Mowing machines are known in the art for cutting grass or other vegetative matter to a desired substantially uniform height. For instance, in the maintenance of golf courses and particularly golf course greens, precise and uniform cutting of the grass is particularly critical for proper performance of the green. Specialized mowers have been developed exclusively for the purpose of properly mowing golf course greens. Two typical examples of such prior art golf course greens mowers include a mower sold by the Toro Company of Bloomington, Minnesota under the registered trademark "GREENSMASTER 1000" and the mower described in the patent to Tsuchiya (U.S. Pat. No. 4,481,757) incorporated herein by reference in its entirety.

Such prior art mowers are characterized by having a cutting reel which is driven by a gas combustion motor or other cutting reel drive. The cutting reel is precisely located above the ground by ground contacting surfaces. These ground contacting surfaces typically include a front cylinder (also referred to as a roller) mounted to a frame of the mower in front of the cutting reel and one or more rear drums or other wheels located to the rear of the cutting reel. The front cylinder and rear drum are oriented tangent with a common plane referred to as the mower support plane. The cutting reel is located above the mower support plane by a height defining a height at which the grass remains after being cut by the cutting reel. Typically, the height of the cutting reel above the mower support plane can be adjusted so that this grass height can be selected as desired.

Most golf course greens include a primary green surface which is a surface which has the grass cut at a shortest height (typically %4 inch). Surrounding the green is a collar (also commonly referred to as a "fringe") which has the grass cut slightly higher (typically ⅜ inch to ½ inch) than that of the green, but lower than that of surrounding grass of the fairway and other landscape surrounding the green. The collar is preferably cut with the same type of greens mower but with the mower used for cutting the collar having the cutting reel positioned further from the mower support plane.

While it would be conceivable to use a single greens mower for cutting both the primary green surface and the collar, such utilization of the greens mower is not practical. Specifically, the precise height requirements of the primary green surface and the collar dictate that the height of the cutting reel be very carefully and precisely set so that the primary green surface and collar are properly cut. Such adjustment is best reliably made within a shop environment where precise measuring equipment and tools are available for making such an adjustment. As the golf course has numerous greens spread out over a large geographic area, repeatedly making these height adjustments between the primary green surface and the collar would be both excessively time consuming and prone to error. Such risk of error is particularly magnified when it is desired that personnel utilize the greens mower which are not skilled in precise mower adjustment.

Accordingly, standard prior art practice in maintenance of a golf course greens typically involves transporting two greens mowers to each green for proper grass cutting. One of the greens mowers has the cutting reel set at the primary green height and the second greens mower has the cutting reel set at the collar height. This common practice requires that twice the number of greens mowers be purchased and maintained by the golf course and requires that twice the amount of equipment be transported between greens on the golf course to effectively maintain the golf course. This common practice also illustrates the undesirability of attempting to adjust the height of the cutting reel in the field, rather than in the shop.

Accordingly, a need exists for a system to quickly, easily and reliably adjust a height of a greens mower or other lawn mower from a first height to a second height. Such a system would provide precise height adjustment and be readily adjustable between the two heights to most effectively allow cutting of both the primary green surface and the collar with a single greens mower. Analogous needs are similarly presented with other types of grass mowers where quick and convenient height adjustment is desired.

SUMMARY OF THE INVENTION

This invention provides a mower height adjustment system which allows a mower such as a golf course greens mower to be readily and precisely adjusted in cutting height such as between a primary green height and a collar height. According to this invention a bearing surface is provided which is removably attachable to the mower. The bearing surface is located below a mower support plane defined by primary ground contacting surfaces (i.e. the front roller/cylinder and rear drum) of the mower. The bearing surface thus raises the cutting reel of the mower away from the ground to a second height, such as for cutting a collar surrounding a golf course green.

The bearing surface can be configured in many different ways and be removably attached in many different ways and still perform according to this invention. The bearing surface is preferably in the form of an elongate substantially cylindrical rotating collar having a configuration similar to the front cylinder of the mower, such that performance of the mower is not altered, other than in grass cutting height, whether the motor rests upon the primary ground contacting surfaces of the mower or the removably attachable bearing surface provided by this invention. The bearing surface is preferably provided as a portion of a riser attachment which facilitates the quick attachment and detachment of the bearing surface to the frame of the mower.

The riser attachment preferably includes a pair of brackets securely attached to the mower, such as with bolts, and removably supports a pair of interfaces which rotatably or otherwise support the bearing surface. Each interface is configured to be quickly removably attached to a corresponding of bracket. For instance, each bracket can be provided with a cavity and the interface provided with an arm which extends into the cavity of the bracket. In this way, the bearing surface, such as a rotatable roller surface is rotatably supported by the interfaces at opposite ends of the bearing surface. The interfaces can be removably attached to the brackets on either side of the mower to present the bearing surface below the mower support plane, slightly lifting the mower and the associated cutting reel to cause the mower to cut at the second higher cutting height.

Preferably, a lever is provided with a threaded post which acts with a threaded side hole in the cavity of each bracket so that the levers can cause the arms of the interfaces to be pinched and secured within the cavities of the brackets when the bearing surface is to be utilized. When the bearing surface is not to be utilized, the levers are merely rotated to release the arms out of the cavities so that the bearing surface and associated interfaces can be removed from the brackets and off of the mower, with the mower then available for use at the first lower cutting height, such as to cut the primary green surface.

A height adjuster is preferably provided to allow for adjustment of a distance at which the bearing surface extends below the mower support plane. Preferably, the height adjuster is in the form of bolts rotatably supported adjacent each cavity to alter a depth of each cavity and hence a distance at which each arm of each interface can extend into each cavity.

OBJECTS OF THE INVENTION

Accordingly, a primary object of the present invention is to provide a system for adjusting a cutting height of a mower.

Another object of the present invention is to provide a riser attachment for quickly, easily and precisely adjusting a height of a greens mower from a primary green cutting height to a collar green cutting height.

Another object of the present invention is to provide a mower height adjustment system which very precisely adjusts a height of a mower between at least two different heights.

Another object of the present invention is to provide a mower height adjustment system which does not alter a performance of the mower other than to alter a height at which grass is cut by the mower.

Another object of the present invention is to provide a riser attachment for a mower which increases a cutting height of the mower when the riser attachment is attached.

Another object of the present invention is to provide a riser attachment which alters a cutting height of a mower with the riser attachment being quickly and easily attached and detached to the mower and precisely altering a height adjustment of the mower.

Another object of the present invention is to provide a riser attachment for a mower which increases a height at which the mower cuts grass and with the riser attachment itself precisely adjustable to adjust an amount of cutting height change provided by the riser attachment when attached.

Other further objects of the present invention will become apparent from a careful reading of the included drawing figures, the claims and detailed description of the invention.

BRIEF DESCRIPTION OF THE DRAWINGS

FIG. 3 is a side view schematic of a portion of that which is shown in FIG. 2 illustrating a cutting height of the mower when the riser attachment is attached to the mower.

FIG. 4 is a side schematic view similar to that which is shown in FIG. 3 but with the riser attachment removed and the mower being used according to the prior art.

FIG. 5 is a perspective view of a portion of the riser attachment of this invention illustrating in detail how a bracket portion of the riser attachment and an interface portion of the riser attachment are coupled together in a quick removable fashion.

DESCRIPTION OF THE PREFERRED EMBODIMENT

Figure 1:
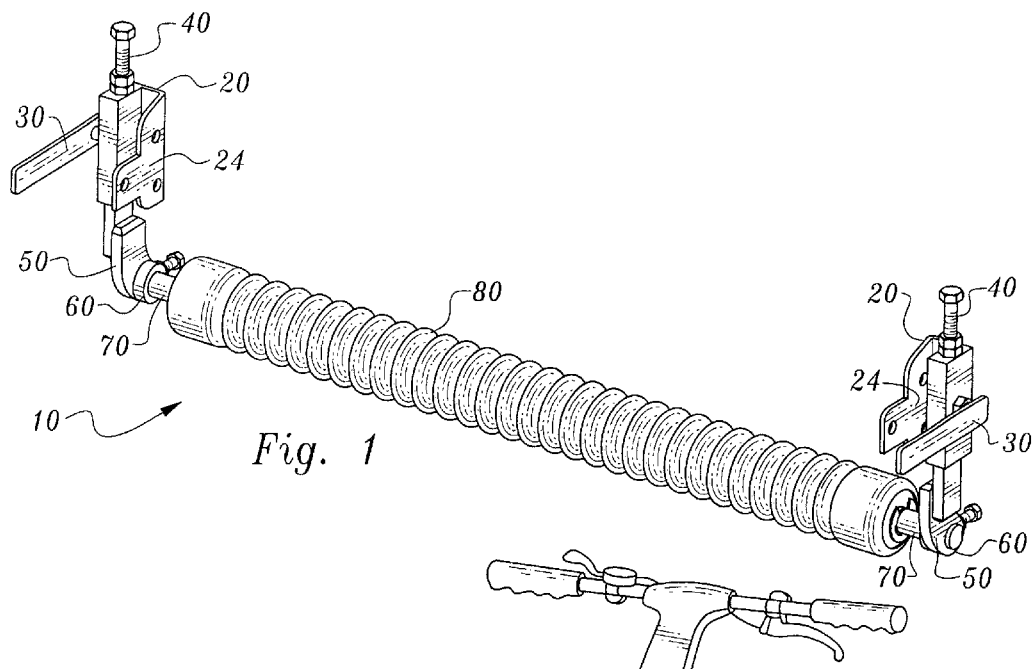
FIG. 1 is a perspective view of the riser attachment of this invention before attachment to a power reel mower such as that used to mow a golf course green, with the riser attachment shown from the rear.

Referring to the drawings, wherein like reference numerals represent like parts throughout the various drawing figures, reference numeral 10 is directed to a riser attachment (FIG. 1) defining a preferred form of mower cutting height adjustment system according to this invention. The riser attachment 10 is removably attachable to a frame 4 of a mower 2 (FIG. 2) so that a height of a cutting reel 5 of the mower 2 can be quickly and precisely adjusted.

In essence, and with particular reference to FIG. 1, basic details of the riser attachment 10 are described. The riser attachment 10 includes two separate removably parts preferably removably attachable to the mower 2 and each other. These parts include a pair of brackets 20 attachable to the mower 2 (FIG. 2) and a roller 80 and associated rotational support equipment, providing a preferred form of bearing surface for the riser attachment 10. The roller 80 is configured to be readily removably attachable to the brackets 20. The brackets 20 preferably include a lever 30 which is rotated to secure and release the roller 80 to each bracket 20. The brackets 20 additionally preferably include a height adjuster 40 which adjusts a distance that the roller 80 is located away from each bracket 20. The height adjusters 40 thus control a height of the cutting reel 5 (FIG. 2) when the riser attachment 10 is coupled to the mower 2.

A pair of interfaces 50 rotatably support the roller 80 and removably attach to the brackets 20 for capture or release through rotation of the lever 30. Each interface 50 includes a collar 60 with an axle 70 extending between the interfaces 50 and through the collars 60. The roller 80 is rotatably supported upon the axle 70. In typical use of the riser attachment 10, the bracket 20 is permanently affixed to the mower, such as by bolting. The roller 80 and associated rotational support equipment is removably attachable to the brackets 20, such that the mower 2 is provided at a standard first cutting height $h_1$ (FIG. 4) when the roller 80 is detached from the brackets 20 and the mower 2 is positioned at an increased second cutting height $h_2$ (FIG. 3) when the roller 80 and associated equipment are attached to the brackets 20.

Figure 2:
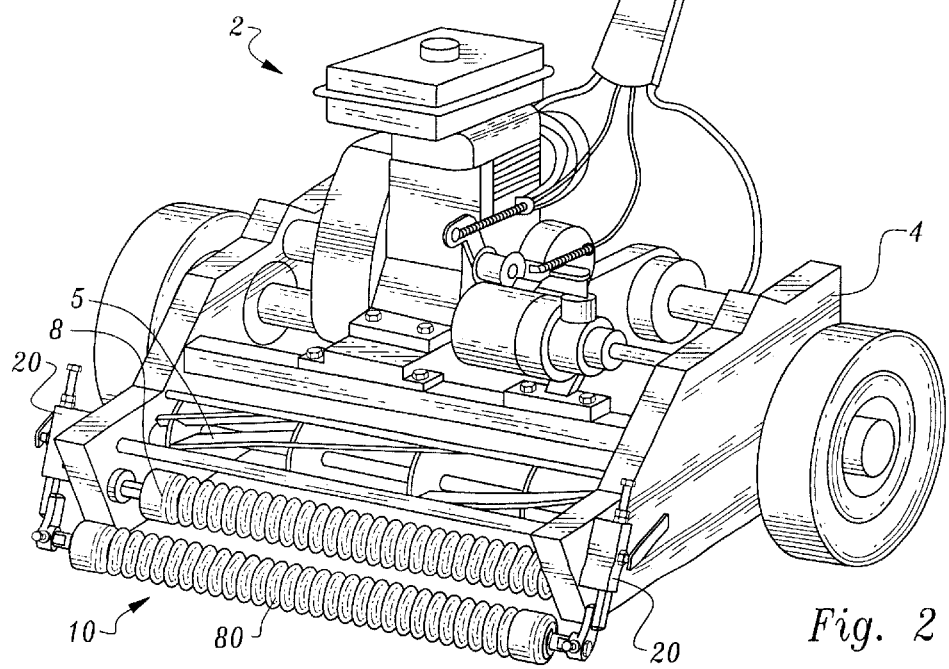
FIG. 2 is a perspective view of a front of a power reel mower with the riser attachment of this invention attached thereto.

More specifically, and with particular reference to FIGS. 2–4, details of the prior art power reel mower 2 to which the preferred embodiment of this invention is directed, are described. This power reel mower 2 is a preferred mower to which the riser attachment 10 is coupled according to a preferred embodiment of this invention. Other mowers of either a powered or manual reel variety or with other cutting implements could similarly be fitted with an appropriately modified riser attachment or with some other form of auxiliary bearing surface according to this invention.

The power reel mower 2 generally includes a rigid frame 4 which supports customary mower equipment including a handle, a motor, optional accessories such as grass clippings catchers and other components. The frame 40 is supported above ground by a pair of primary ground contacting surfaces, preferably in the form of a differential drum or other wheel-like rotating structures. Particularly, a front cylinder 8 (also called a front roller) is preferably provided having a width substantially similar to that of the frame 4. A two piece rear drum 6 (or other rear wheels) are rotatably coupled to the frame 4 near a rear of the frame 4. A cutting reel 5 is rotatably supported by the frame 4, typically between the rear drum 6 and the front cylinder 8.

A mower support plane P (FIG. 4) is defined as a plane in which both the front cylinder 8 and the rear drum 6 both are located in a tangent fashion. When the mower 2 is in its standard prior art configuration (FIG. 4) this mower support plane P is co-planar with a surface of the ground G. A height of the cutting reel 5 is defined as a distance from the cutting edge of the cutting reel 5 and the mower support plane P, represented by dimension $h_1$. This $h_1$ dimension would typically be the desired height for cut grass within a primary golf course green, typically $\%_{64}$ inch.

While the rear drum 6 is preferably a two piece drum, alternatively the rear drum 6 can be replaced by wheels or other rotating supports. Preferably, the front cylinder 8 is provided with a substantially cylindrical surface, but which can be undulating, as known in the prior art, to minimize compression or other damage to the grass immediately prior to cutting. One form of mower 2 which the riser attachment 10 is particularly configured to attach with is a Greens Mower manufactured by the Toro Company of Bloomington, Minnesota under the registered trademark "GREENSMASTER 1000." Another mower 2 to which the riser attachment 10 can be configured to be coupled is a mower such as that described in U.S. Pat. No. 4,481,757, incorporated herein by reference in its entirety.

While the mower 2 could be permanently modified to have the brackets 20 of the riser attachment 10 attached thereto, preferably mounting bores 9 (FIG. 4) already existing within the prior art frame 4 of the mower 2 which can be utilized for attachment of the brackets 20. Specifically, forward portions of the frame 4 typically have mounting bores 9 already located therein for supporting a pin 7 to hold a grass clippings catcher. Preferably, the brackets 20 of the riser attachment 10 are configured with holes of a similar size and spacing to cooperate with such already existing holes within the frame 4 of the mower 2 so that the mower 2 need not be modified in a permanent fashion to accommodate the riser attachment 10.

Figures 6, 7:
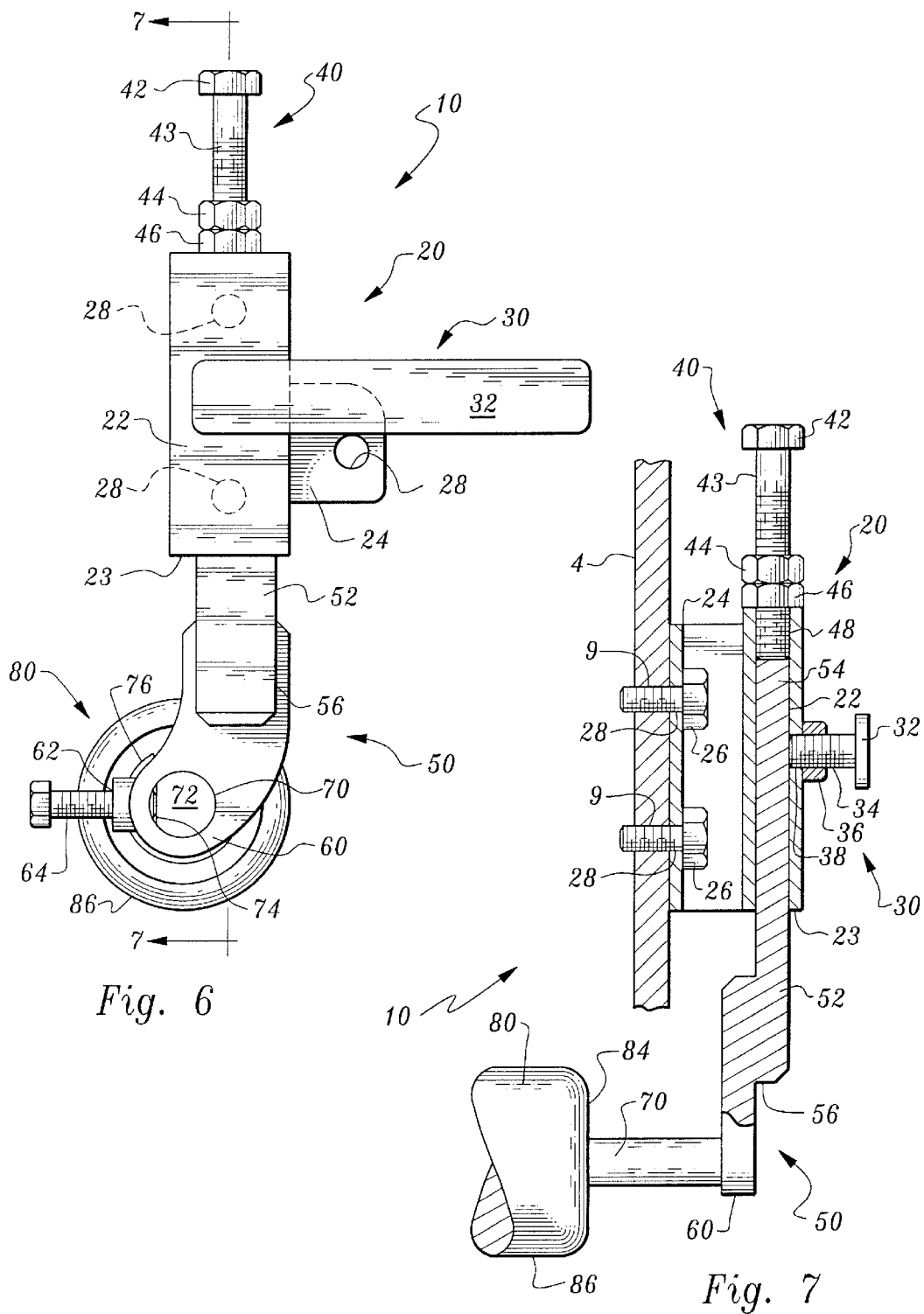
FIG. 6 is a side elevation view of that which is shown in FIG. 1 with the interface portion of the riser attachment secured to the bracket portion of the riser attachment.
FIG. 7 is a sectional view of that which is shown in FIG. 6 and with portions of the interface removed to enhance clarity and including a portion of the frame of a reel mower to which the riser attachment is attached.

With particular reference to FIGS. 5–7, details of the brackets 20 of the riser attachment 10 are described. Preferably, a pair of brackets 20 are provided to support opposite ends of the elongate bearing surface, preferably in the form of the roller 80. The two brackets 20 are mirror images of each other. For convenience, the two brackets 20 are described in the singular. The bracket 20 provides a preferred form of a portion of a means to removably couple the bearing surface, such as the roller 80, to the mower. However, the particular configuration of the bracket 20 could be altered to removably support bearing surfaces and associated rotatable support structures or non-rotating support structures to achieve the objects of this invention.

The bracket 20 is a rigid unitary mass contoured to facilitate secure attachment to the frame 4 of the mower 2 (FIG. 2) and to facilitate removable attachment of the bearing surface, preferably in the form of the roller 80, and associated rotational support equipment, so that the roller 80 and associated equipment can be readily attached/detached to the mower 2 through the bracket 20. The bracket 20 includes a cavity 22 which extends substantially linearly in a generally upward direction from an opening 23. The cavity 22 preferably extends linearly, but could extend along a curve. The cavity 22 preferably is in the form of a completely enclosed structure other than the opening 23. However, the cavity 22 could alternatively have a variety of openings, so long as the cavity 22 can effectively hold portions of roller 80 support structure in a removably attachable fashion.

A flange 24 extends from the cavity 22. The flange 24 is preferably in the form of a thin plate having a contour matching a contour of a side of the frame 4 adjacent the mounting bores 9 (FIGS. 4 and 7). The flange 24 includes mounting holes 28 passing therethrough. The mounting holes 28 are preferably similar in size and spacing to mounting holes 9 in the frame 4.

Preferably, three mounting holes 28 are provided with only two of the three mounting holes required for coupling of the bracket 20 securely to the mower 2. Specifically, two of the mounting holes 28 are preferably aligned with a long axis of the cavity 22. These two cavity aligned mounting holes 28 would typically be utilized with mounting bores 9 (as shown in FIG. 4) on the frame 4 which would otherwise typically be utilized only to support a grass clippings catcher.

If the mower 2 is equipped with a groomer to groom the grass immediately prior to being cut, such mowers typically include a slightly different mounting bore configuration. With such a configuration, a mounting hole 28 most distant from the opening 23 is utilized along with a third mounting hole 28 located upon a tab which extends rearwardly away from the cavity 22. This alternative including use of the mounting hole 28 on the tab is that illustrated in the figures. If the tab is not to be used it can be cut off or left unused.

Mounting bolts 26 (FIG. 7) pass through the appropriate mounting holes 28 and are then pass through the pin 7 (FIG. 4) and the mounting bores 9 in the frame 4 of the mower 2 (FIG. 7), typically with a corresponding nut. In this way, the bracket 20 is securely and rigidly attached to the mower 2. If desired, the bracket 20 can be removed merely by first removing the mounting bolts 26.

With the pair of brackets 20 each mounted to opposite sides of the frame 4 of the mower 2, the riser attachment 10 of this invention is now ready for use either with the roller 80 or other bearing surface or without the roller 80 or other bearing surface. In either use configuration, the brackets 20 would typically remain attached to the frame 4 of the mower 2.

Preferably, the bracket 20 includes a lever 30 as a preferred form of means to securely but removably fasten or otherwise secure an arm 52 or other structure supporting the roller 80 or other bearing surface, and associated support equipment, to the mower 2. The lever 30 includes a handle 32 which can be conveniently grasped by a hand of a user. A threaded post 34 is coupled to a pivot point of the handle 32. This threaded post 34 passes through a threaded hole, such as provided by welding a nut 36 onto a side of the cavity 22 overlying a cavity side hole 38.

In this way, rotation of the handle 32 of the lever 30 (along arrow B of FIG. 5) causes the threaded post 34 to rotate and extend into and out of the cavity 22 through the cavity side hole 38. This threaded post 34 can pinch a structure such as the arm 52 within the cavity 22 to capture the roller 80 or other bearing surface and associated support equipment adjacent the bracket 20. Rotation of the handle 32 allows for quick attachment and detachment of the roller 80 or other bearing surface to the bracket 20 and hence to the mower 2.

With particular reference to FIGS. 3 and 5–7, details of the height adjuster 40 of the preferred embodiment of the riser attachment 10 are described. While the riser attachment 10 could be configured without any height adjustment and still provide for adjustment of a cutting height of the mower 2, preferably the riser attachment 10 can be fine tuned in the amount of additional height provided when the riser attachment 10 is coupled to the mower 2. Such fine tuning allows for precise control of a difference in cutting height between the standard first cutting height $h_1$ (FIG. 4) of the mower 2 without the riser attachment 10 and the second cutting height $h_2$ (FIG. 3) of the mower 2 when the riser attachment 10 is attached to the mower 2.

The height adjuster 40 is preferably in the form of a bolt 42 having a threaded shaft 43 extending through a cavity tip hole 48 (FIG. 7) and into an end of the cavity 22 opposite the opening 23. The threaded shaft 43 of the bolt 42 in essence controls a depth of the cavity 22, and thus controls a spacing of the roller 80 relative to the bracket 20 and relative to the mower 2 to which the brackets 20 are attached.

The cavity tip hole 48 preferably includes female threads adjacent thereto, such as by welding a nut adjacent the cavity tip hole 48. Rotation of the bolt 42 thus causes the threaded shaft 43 to extend further into the cavity 22 or out of the cavity 22 when the bolt 42 is rotated along arrow C of FIG. 5.

Once the bolt 42 has been positioned where desired, the position can be secured against inadvertent further adjustment by providing a means to lock the height adjuster or other height adjustment means. Preferably, the means to lock the height adjustment means is in the form of a free nut 44 rotated upon the threaded shaft 43.

Once the bolt 42 has been positioned where desired extending into the cavity 22, the free nut 44 is rotated (along arrow D of FIG. 5) down the threaded shaft 43 of the bolt 42, until the free nut 44 impacts the captured nut 46. Tightening of the free nut 44 against the captured nut 46 tightly engages the threads of the threaded shaft 43 with the threads of the captured nut 46 and the free nut 44. The bolt 42 is then kept from rotating, unless an appropriate torque applying tool is again applied to the free nut 44 in an opposite direction to rotatably move the free nut 44 away from the captured nut 46. Other locking means could similarly be utilized to prevent inadvertent rotation of the bolt 42. Also, other height adjustment means could be utilized other than the bolt 42 to provide fine tuning of the position of the roller 80 or other bearing surface relative to the mower 2.

With particular reference to FIGS. 5–7 details of the interfaces 50 and other structures for supporting the roller 80 or other bearing surface and coupling the roller 80 or other bearing surface to the bracket 20, are described. The interfaces 50 preferably provide a non-rotating bearing surface support structure removably attachable to each bracket 20 on opposite sides of the frame 4 of the mower 2.

Each interface 50 includes a rigid arm 52 having a cross-sectional shape and length similar to that of the cavity 22. Thus, the arm 52 can extend up into the cavity 22 through the opening 23. The arm 52 includes a free end 54 which extends most deeply into the cavity 22 and a base 56 opposite the free end 54. A side of the arm 52 between the free end 54 and base 56 is pinched by the threaded post 34 of the lever 30 when the arm 52 is within the cavity 22 and the interface 50 is to be secured to the bracket 20.

Each interface 50 extends below the base 56 of the arm 52 to support a collar 60. The collar 60 or other axle 70 support structure is preferably a generally annular structure with a central hole configured to receive the axle 70 therethrough. A side hole 62 extends through the annular collar 60 and into the central hole of the collar 60. A set screw 64 is located within the side hole 62 and can be tightened to secure tips 72 of the axle 70 within each of the collars 60 in each of the interfaces 50 on either side of the riser attachment 10.

The axle 70 is preferably an elongate rigid structure having a generally circular cross-section. Each tip 72 of the axle 70 is located within one of the collars 60. A flat 74 is preferably located adjacent each tip 72. The flat 74 can be oriented facing the side hole 62 of each collar 60 so that the set screw 64 can engage the flat 74 and prevent rotation of the axle 70.

A pair of groove 78 extend radially into the axle 70 and circumferentially surrounding the axle 70. Locking rings 76 are sized to snap into the grooves 78. The roller 80 is configured to be axially trapped between the lock rings 76 adjacent the tips 72 of the axle 70. The roller 80 includes a central bore 82 generally in the form of a journal bearing through which the axle 70 passes. Ends 84 of the roller 80 are located adjacent the locking rings 76. A surface 86 of the roller 80 provides a preferred form of bearing surface for the riser attachment 10 of this invention. This surface 86 is preferably substantially cylindrical and has an undulating contour similar to that of the front cylinder 8 of the mower 2. In this way, the function of the mower 2 is identical, other than cutting height, whether the roller 80 is in use or removed from the mower 2.

When the roller 80 or other bearing surface is coupled to the bracket 20 through the associated support structure at either end of the roller 80 or other bearing surface, the surface 86 of the roller 80 or other bearing surface is located a precise distance away from the bracket 20. This location of the surface 86 or other bearing surface is below the mower support plane P (FIGS. 3 and 4). Thus, when the mower 2 rests upon the ground G with the roller 80 or other bearing surface coupled to the mower 2, the cutting reel 50 is elevated somewhat. A second cutting height represented by dimension $h_2$ (FIG. 3) is thus provided when the riser attachment 10 of this invention is utilized.

In use and operation, and with particular reference to FIGS. 2–5, details of the attachment and use of this invention are described. This description is provided in the context of mowing of a primary green surface and a collar of the green, with the mowing of other areas occurring in an appropriately modified fashion. Initially, any structures coupled to the mower 2 through the mounting bores 9 other than the pins 7 (FIG. 7) are removed. Next, a pair of brackets 20 are attached to the appropriate mounting bores 9 (FIGS. 2–4) with mounting bolts 26 (FIG. 7). Once the brackets 20 have been securely attached to the mower 2, the roller 80 or other bearing surface and accompanying support structures are coupled to each bracket 20, such as by extension of the arms 52 into each of the cavities 22 (arrow A) of the brackets 20.

The height $h_2$ (FIG. 3) of the cutting reel 50 is then carefully measured and compared to a desired height for the collar of the green. The height adjuster 40 is utilized to fine tune the size of the second cutting height $h_2$. Specifically, the free nut 44 is rotated (arrow D) to be moved away from the capture nut 46. The bolt 42 is then rotated (arrow C) until a desired second cutting height $h_2$ is achieved. The free nut 44 is then rotated until it abuts the captured nut 46 to secure the bolt 42 in the desired position. This procedure is repeated for each height adjuster 40 on each bracket 20.

The roller 80 or other bearing surface and associated support structure are then removed from the brackets 20. The mower 2 and portions of the riser attachment 10 other than the bracket 20 are then transported to the location of the green to be mowed. The mower 2 is then utilized in standard fashion to mow the primary surface of the green.

When the primary surface of the green has been entirely mowed, the portions of the riser attachment 10 other than the bracket 20 are coupled to the bracket 20. Specifically, the arms 52 slide into the cavities 22 (along arrow A of FIGS. 3 and 5). Once the arms 52 have extended entirely up into the cavity 22, the handle 32 of the lever 30 is rotated (arrow B of FIGS. 3 and 5) to secure the arms 52 within the cavity 22 of the brackets 20. The mower 2 is then configured as shown in FIG. 3 with the second cutting height $h_2$.

The mower 2 is then utilized to cut the grass forming the collar surrounding the green. The user would then typically transport the mower 2 to the next green to be mowed and cut the grass forming the collar at the next green. The portions of the riser attachment 10 other than the bracket 20 are then removed by rotation of the handle 32 of the lever 30 on each bracket 20 and removal of the roller 80 and associated support equipment from the brackets 20. The mower 2 is then configured for mowing of the primary surface of the green at the first cutting height $h_1$. This process can then be repeated until all of the greens of the golf course have been appropriately mowed.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A mower having at least two cutting heights, comprising in combination:
    a frame;
    a cutting implement rotatably supported by said frame;
    a driver coupled to said frame and said cutting implement and adapted to drive said cutting implement to cut grass contacting said cutting implement;
    at least two primary ground contacting surfaces;
    said at least two primary ground contacting surfaces defining a mower support plane;
    said cutting implement located above said mower support plane by a distance substantially equal to a first cutting height;
    a bearing surface removably coupleable to said mower; and
    said bearing surface located below said mower support plane when said bearing surface is coupled to said mower, such that said mower is at least partially supported upon the ground through said bearing surface and said cutting implement is lifted to a second cutting height greater than said first cutting height.

2. The mower of claim 1 wherein said bearing surface is located upon a riser attachment, said riser attachment removably attachable to said frame of said mower.

3. The mower of claim 2 wherein said riser attachment includes a bracket fastened to said frame, said bearing surface coupled to an interface, said interface adapted to be toollessly removably coupled to said bracket.

4. The mower of claim 3 wherein said bearing surface is a substantially cylindrical surface of a roller, said roller rotatably connected to said interface.

5. The mower of claim 4 wherein said interface includes an arm extending linearly and said bracket includes a substantially linear cavity sized to receive said arm therein.

6. The mower of claim 1 wherein a height adjuster is located between said bearing surface and said frame, said height adjuster adapted to change a distance at which said bearing surface extends below said mower support plane, such that said second cutting height can be adjusted.

7. The mower of claim 6 wherein said height adjuster includes a threaded bolt rotatable within a threaded hole with the height of said bearing surface below said mower support plane adjusted when said bolt is rotated; and
    means to lock said bolt rotationally so that said bolt is prevented from further movement while said locking means is engaged.

8. The mower of claim 1 wherein said bearing surface is a substantially cylindrical surface of a roller, said roller rotatably attached to said frame.

9. The mower of claim 8 wherein said roller has a configuration similar to at least one of said primary ground contacting surfaces.

10. The mower of claim 9 wherein said at least two primary ground contacting surfaces include a front cylinder rotatably attached to said frame in front of said cutting implement and a second primary ground contacting surface behind said cutting implement; and
    wherein said roller providing said bearing surface is adapted to be removably attached in front of said front cylinder when said bearing surface is coupled to said mower.

11. The mower of claim 10 wherein said roller is similar to said front cylinder.

12. The mower of claim 11 wherein said bearing surface is located upon a riser attachment, said riser attachment removably attachable to said frame of said mower; and
    wherein said riser attachment includes a bracket secured to said frame, said roller rotatably coupled to an interface, said interface adapted to be toollessly removably coupled to said bracket.

13. The mower of claim 12 wherein said interface includes an arm extending linearly and said bracket includes a substantially linear cavity sized to receive said arm therein.

14. The mower of claim 13 wherein a height adjuster is located between said bearing surface and said frame, said height adjuster adapted to change a distance at which said bearing surface extends below said mower support plane, such that said second cutting height can be adjusted;
    wherein said height adjuster includes a threaded bolt rotatable within a threaded hole with the height of said bearing surface below said mower support plane adjusted when said bolt is rotated; and means to lock said bolt rotationally so that said bolt is prevented from further movement while said locking means is engaged.

15. A riser attachment for a mower to change a grass cutting height at which the mower cuts, the mower having at least two ground contacting surfaces without said riser attachment, the riser attachment comprising in combination:

a bearing surface adapted to support at least a portion of the mower upon the ground through said bearing surface when said bearing surface is coupled to the mower; and a fastener adapted to removably fasten said bearing surface to the mower with said bearing surface lower than a plane in which the ground contacting surfaces are located, such that at least a portion of the mower is elevated and the grass cutting height is changed.

16. The riser attachment of claim 15 wherein said bearing surface is a substantially cylindrical surface of a roller, said roller adapted to be rotatably attached to the mower.

17. The riser attachment of claim 16 wherein said roller is similar to at least one of the ground contacting surfaces of the mower to which said roller is adapted to be rotatably attached.

18. The riser attachment of claim 15 wherein said fastener includes a height adjuster adapted to set a height at which said bearing surface extends below said plane in which the ground contacting surfaces of the mower are located.

19. The riser attachment of claim 18 wherein said height adjuster includes a threaded bolt rotatable within a threaded hole with the height of said bearing surface below said mower support plane adjusted when said bolt is rotated.

20. The riser attachment of claim 19 wherein said height adjuster includes a means to lock said bolt rotationally so that said bolt is prevented from further movement while said locking means is engaged.

21. The riser attachment of claim 15 wherein said fastener includes a pair of interfaces, said bearing surface having an elongate form between ends, each of said pair of interfaces connected to one of said ends of said bearing surface; and said fastener including a pair of brackets adapted to be coupled to the mower, the brackets each including means to releasably hold one of said interfaces adjacent one of said brackets.

22. The riser attachment of claim 21 wherein each said bracket includes an elongate cavity therein and each said interface includes an elongate arm therein sized to slide into and out of one of said cavities of one of said brackets.

23. The riser attachment of claim 22 wherein at least one of said cavities includes a side hole therein with female threads adjacent thereto, said fastener including a threaded post extending through said side hole with a lever attached to said threaded post adapted to manually rotate said threaded post into said side hole, such that said threaded post can pinch said arm within said cavity to hold said bearing surface removably to said bracket coupled to the mower.

24. The riser attachment of claim 23 wherein said height adjuster includes a threaded bolt rotatable within a threaded hole with the height of said bearing surface below said mower support plane adjusted when said bolt is rotated; and means to lock said bolt rotationally so that said bolt is prevented from further movement while said locking means is engaged.

25. The riser attachment of claim 21 wherein said pair of brackets each include mounting holes adapted to be aligned with bores on opposite sides of the mower, said fastener including mounting bolts adapted to pass through said mounting holes in said brackets and thread into the holes in the mower to removably attach the brackets to opposite sides of the mower for removable attachment of the bearing surface thereto.

26. The riser attachment of claim 21 wherein said interfaces are each rotatably connected to said bearing surface, said bearing surface configured as a substantially cylindrical surface of a roller.

27. The riser attachment of claim 26 wherein an axle is rigidly connected to each said interface with said roller rotatably supported upon said axle.

28. The riser attachment of claim 27 wherein each said interface includes a collar with a non-circular cross-section matching a non-circular contour of tips of said axle, said collar including a set screw therein adapted to hold said axle relative to said collar without rotation there between, said axle including one groove adjacent each said tip with a locking ring located within said groove, said locking rings adapted to prevent said roller from translating laterally along said axle.

29. A system for adjusting a mower cutting height for a mower having a cutting implement and at least two primary ground contacting surfaces defining a mower support plane, with the cutting implement located above the mower support plane by a distance substantially equal to a first cutting height, the height adjustment system comprising in combination:

a bearing surface adapted to support at least a portion of the mower above ground, said bearing surface located below said mower support plane when said bearing surface is coupled to the mower; and means for removably coupling said bearing surface to the mower, such that the cutting implement is at a second cutting height when said bearing surface is coupled to the mower, the second cutting height higher than the first cutting height when said bearing surface is not coupled to the mower.

30. The system of claim 29 wherein said bearing surface is an elongate substantially cylindrical roller with a pair of rotational supports located at ends of said roller, said means for removably coupling said bearing surface to the mower located between each of said rotational supports and the mower.

31. The system of claim 30 wherein said means for removably coupling said bearing surface to the mower includes means for removably fastening said rotational supports to the mower.

32. The system of claim 31 wherein said means for removably coupling said bearing surface to the mower includes a pair of brackets removably bolted to the mower in a non-rotational fashion and with said rotational supports removably and non-rotationally secured to said bracket through said means for removably fastening said rotational supports to the mower.

33. The system of claim 32 wherein said means for removably fastening said rotational supports to the mower includes a linear cavity within said bracket and a linear arm extending from each of said pair of rotational supports, said linear arm sized to slide linearly into and out of said cavity; and means to secure said arm removably within said cavity.

34. The system of claim 32 wherein said means for removably coupling said bearing surface to the mower includes a means to adjust a distance that said bearing surface extends below said mower support plane.

35. The system of claim 34 wherein said means to adjust the distance said bearing surface extends below the mower support plane includes a hole in an end of said cavity opposite an opening into said cavity adapted to receive said arm, said hole having female threads adjacent thereto with a threaded bolt rotatably supported within said hole such that a tip of said bolt resides within said cavity and a depth of said cavity is defined by a position of said tip of said bolt with said cavity depth adjusted by rotation of said bolt.

36. The system of claim 35 including a means for selectively locking a position of said bolt relative to said cavity.

37. The system of claim 36 wherein said locking means includes a nut having female threads therein between said hole in said cavity and a head of said bolt, said nut adapted to rotate upon a threaded shaft of said bolt with said nut locking a position of said bolt relative to said cavity when said nut is rotated down on said threaded shaft of said bolt into contact with said cavity.

38. The system of claim 29 wherein said means for removably coupling said bearing surface to the mower includes means to adjust the distance said bearing surface extends below the mower support plane.

39. A method for adjusting a mower cutting height for a mower having a cutting implement and at least two primary ground contacting surfaces defining a mower support plane with the cutting implement located above the mower support plane by a distance substantially equal to a first cutting height, the mower cutting height adjusting method including the steps of:

providing a bearing surface adapted to support at least a portion of the mower above ground when the bearing surface is coupled to the mower; and removably attaching the bearing surface to the mower with the bearing surface located below the mower support plane, such that the cutting implement is raised to a second cutting height higher than the first cutting height.

40. The method of claim 39 including the further step of removing the bearing surface from the mower, such that the cutting implement is lowered to the first cutting height.

41. The method of claim 39 including the further step of adjusting the distance by which the bearing surface extends below the mower support plane, such that the second cutting height is adjusted.

42. The method of claim 41 wherein said adjusting step includes providing at least one bracket attached to the mower with a cavity therein adapted to removably receive a bearing surface support structure therein, said cavity including a hole in an end of the cavity opposite an opening for the bearing surface support structure, the hole having female threads adjacent thereto with a threaded bolt rotatably supported within the hole such that a tip of the bolt resides within the cavity and a depth of the cavity is adjusted by rotation of the bolt.

43. The method of claim 39 including the further step of configuring the bearing surface to match at least one of the two primary ground contacting surfaces, such that mower performance is not altered by said attaching step other than to adjust cutting height of the mower.

44. The method of claim 39 wherein said attaching step includes the steps of providing a pair of brackets removably bolted to the mower in a non-rotational fashion and with the bearing surface adapted to be removably attached to each of the brackets.

45. The method of claim 44 wherein said attaching step further includes the steps of:

providing each bracket with a linear cavity;

providing the bearing surface with an elongate form between ends each coupled to a linear arm adapted to slide linearly into and out of the cavity; and providing a means to secure each arm removably within each cavity.

\* \* \* \* \*